No. 861,455. PATENTED JULY 30, 1907.
F. F. GATES.
WATER HEATING APPARATUS.
APPLICATION FILED NOV. 9, 1906.
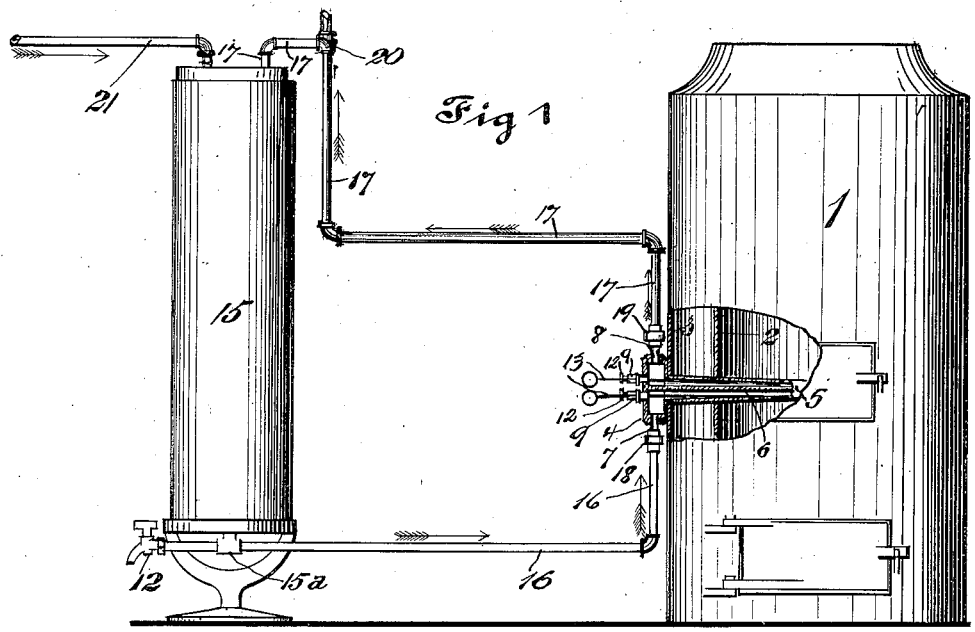
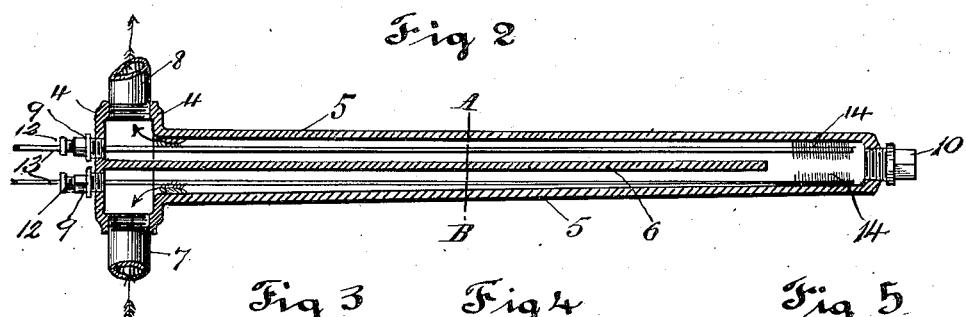
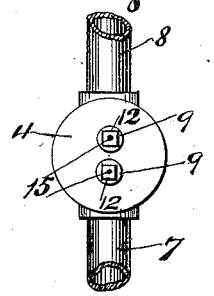
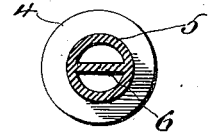
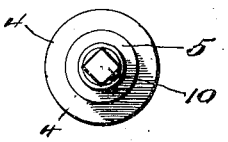
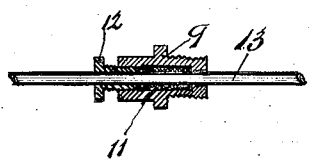
WITNESSES:
Francis M. Springer
J. M. Springer
INVENTOR
Frederick F. Gates
BY
Thompson & Bell
ATTORNEY

UNITED STATES PATENT OFFICE.

FREDERICK F. GATES, OF INDIANAPOLIS, INDIANA.

WATER-HEATING APPARATUS.

No. 861,455.  Specification of Letters Patent.  Patented July 30, 1907.

Application filed November 9, 1906. Serial No. 342,646.

*To all whom it may concern:*

Be it known that I, FREDERICK F. GATES, a citizen of the United States, residing at Indianapolis, in the county of Marion and State of Indiana, have invented certain new and useful Improvements in Water-Heating Apparatus, of which the following is a specification, reference being had therein to the accompanying drawing.

My invention relates to an improved water heating attachment for furnaces or heating stoves and will be hereinafter described in the specification and particularly pointed out in the claims.

The object of this invention is to provide a cheap, durable and effective water heating attachment for furnaces or heating stoves whereby a residence provided with a heating stove or furnace may be provided with a water heating apparatus to supply a constant supply of hot water at little expense. I attain this object by means of the heating apparatus illustrated in the accompanying drawings in which like numerals of reference designate like parts throughout the several views.

Figure 1 is a broken view of a heating stove or furnace showing my water-heating apparatus connected thereto; Fig. 2 is an enlarged detail longitudinal sectional view of the water-heating tube of my water heating apparatus; Fig. 3 is an enlarged view of the head end of the water-heating tube; Fig. 4 is a transverse section of the same taken along the line A. B. in Fig. 2; Fig. 5 is an end view of said water-heating tube looking directly at the smaller end thereof; and, Fig. 6 is an enlarged detail longitudinal sectional view of the packing-box of the rod or stem of the cleaning-out brush.

The heating-furnace or heater 1 to which the water-heating apparatus is connected may be of any of the well known types of heating-furnaces used for heating dwellings and is in most cases provided with an inner fire-inclosing casing 2 and an outer casing 3 which is sufficiently larger than the inner casing 2 to completely inclose the latter and at the same time provide an ample air space between it and the inner casing for heating air supplied to said space to be distributed to the various apartments of a dwelling.

The water-heating tube is constructed in one integral piece and comprises an enlarged head portion 4, a tapered cylindrical portion 5 which is tapered or gradually reduced from that portion of the end of said tube that is connected to the head-portion to its smaller end, which form is provided for the purpose of more readily fitting said cylindrical portion of said tube into the openings formed in the outer and inner casings of the furnace to form close joints therewith and to prevent the escape of gases or smoke from the inner fire-inclosing casing of the furnace to the air space situated between the inner and outer casings of said furnace. A dividing wall 6 is formed integral with the tube 5 and its head 4 and the said wall extends from the interior of the front wall of said head 4 longitudinally and centrally of the tube 5 near to the end of the smaller end of said tube but not too near so as not to contract the area of the open space between and connecting the upper and lower water-circulating compartments or spaces into which said horizontally extending dividing wall divided the tube 5. A pipe-nipple 7 is connected to the lower intake compartment of the head-portion 4 and the pipe-nipple 8 is connected to the top compartment of said head-portion, and to these nipples the pipe connections of the apparatus are connected, as will be hereinafter described.

Clean-out openings are provided in the front wall of the head-portion 4 and the smaller end portion of the tube 5 and the said openings are screw-threaded to receive their removable screw-plugs 9 and 10. The plugs 9 are provided with the packing receptacles 11 and the packing glands 12 which latter are screwed into the ends of said packing receptacles to compress the packing contained therein to compact it around the rods 13 of the cleaning brushes to prevent the water contained in the said water-heating tube leaking through the bores of said packing glands.

The brush-rods 13 are sufficiently long to extend through said packing boxes of the plugs 9 to the extreme end of said water-heating tube, and on the end of each rod are secured suitable bristles or steel wires 14 which are provided for the purpose of brushing the interior of said tube to clean out the upper and the lower water circulating spaces or compartments and removing all scale and deposit therefrom, which is readily accomplished by moving the brush rods 13 backwardly and forwardly to cause said brushes 14 to pass over the surfaces of the interior of said tube to loosen and to remove the scale or deposit therefrom and prevent the accumulation of deposit or the formation of scale which would soon obstruct the passages of the said tube and prevent the circulation of the water.

A collecting tank or reservoir 15 is conveniently situated or is situated at a suitable distance from the furnace 1 to which the water-heating apparatus is connected. The lower pipe 16, which is composed of two sections coupled together, is connected at one end to the bottom of the tank or reservoir 15 by a T-coupling 15ᵃ and at its other end to the lower pipe-nipple 7 by an union 18 and the pipe 17, which is composed of several sections coupled together, is connected at one end to the top of the tank or reservoir 15 and at its other end to the upper pipe nipple 8 by an union 19, so that the said pipes 16 and 17 may be readily disconnected at their ends situated near the head 4 of the water-heating tube 5 when it becomes necessary to remove a worn out water-heating tube and replace it with a new one. A coupling 20 is provided on the return-pipe 17 to which a system of hot-water pipes may be connected to convey hot-water to the various compartments of a dwelling.

The cold water supply-pipe 21 is connected to the water service pipes or other source of water supply and at its other end to the top of the tank or reservoir 15 whereby water under pressure is supplied continuously to said tank or reservoir.

The operation of the apparatus will be better understood by the following description. The pipe 21 connected to the top of the tank or reservoir 15 supplies cold water under pressure continuously to the said tank or reservoir and this cold water supply flows through the pipe 16 to the lower compartment of the water heating tube and, as it becomes heated, passes from the lower compartment around the end of the dividing wall 6 to and through the upper compartment of said water heating tube to and through the return pipe 17 into the tank or reservoir 15 at the top thereof, and this circulation will continue, for the water contained in said tank or reservoir will be always much colder at the bottom portion than at the top portion, and the cold water will therefore flow to and through the pipe 16 into the lower compartment of the water-heating tube, and, as the water is heated therein, it will pass along and through said compartment into and through the upper return compartment into the return pipe 17 to and into said tank or reservoir 15 to maintain a constant supply of hot water therein.

I claim:—

In a water heating attachment for furnaces or other heaters, the combination with a furnace provided with a water-heating tube-receiving opening extending through the casing of said furnace and situated in a plane above the level of the top of the fire contained in said furnace, of a water-heating tube having a tapered exterior surface fitted into and extending through said opening with its smaller end projecting over the fire of the furnace, said water-heating tube provided with a cleaning-out hole, a removable screw-plug screwed into said hole, an enlarged head-portion formed integral on the larger end of said tube and situated exteriorly of said furnace, an interior dividing wall situated centrally of the said water-heating tube and its enlarged head-portion and extending from the head or enlarged end near to the smaller end of said tube to form a connecting passage or way between the upper and lower compartments into which the tube is divided, cleaning-out holes formed in the end of said head and situated opposite the ends of the compartments of said water tube, removable screw-plugs screwed into said holes, packing boxes formed in said plugs and brush-rods passing through said packing boxes to the interior of said water-heating tube.

In testimony whereof I affix my signature in presence of two witnesses.

FREDERICK F. GATES.

Witnesses:
THOMPSON R. BELL,
FRANCIS M. SPRINGER.